June 14, 1966  B. BURWELL  3,256,057
PROCESS OF RECOVERING HIGH PURITY TUNGSTEN COMPOSITIONS FROM TUNGSTEN-BEARING ORES
Filed Oct. 26, 1962
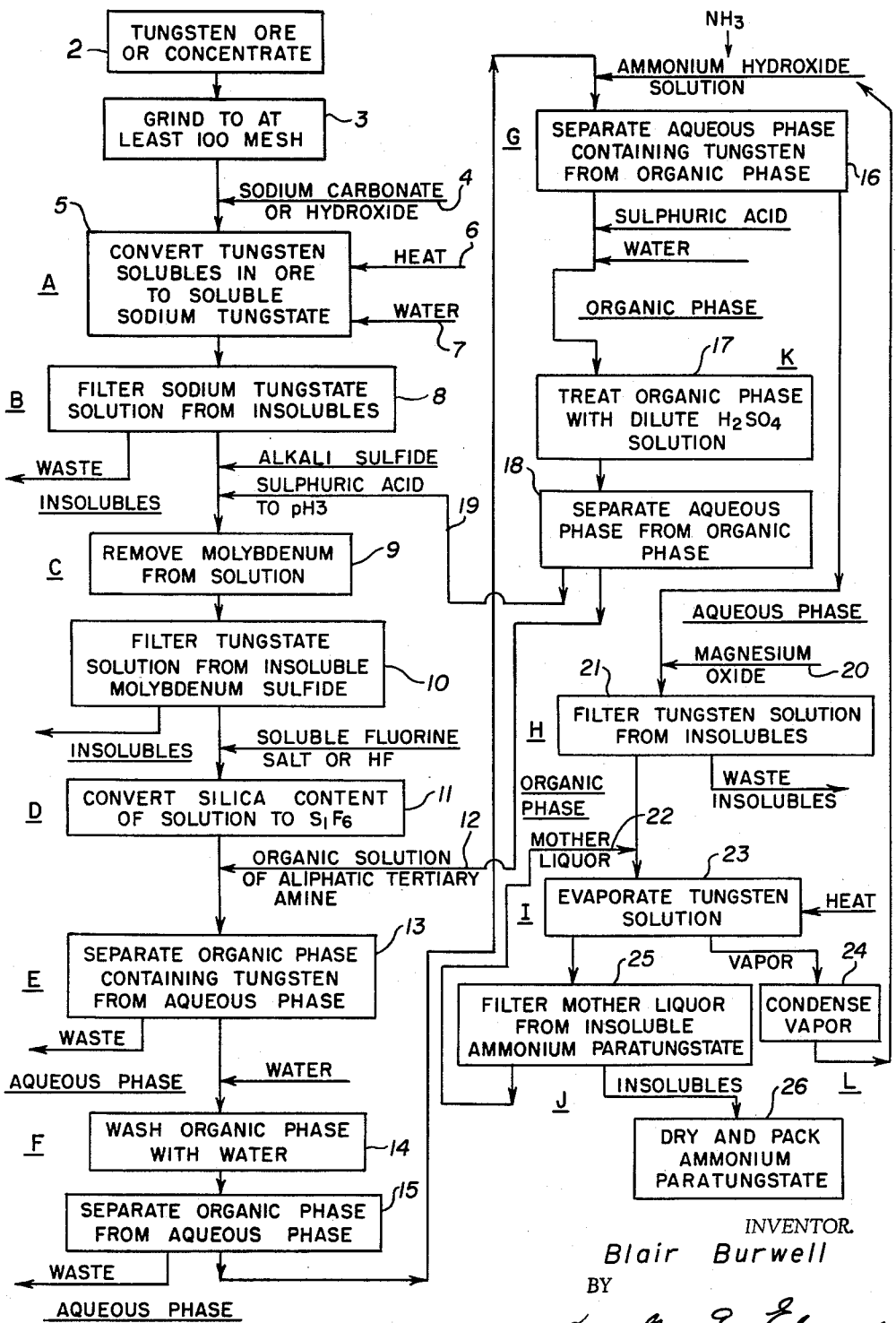
INVENTOR.
Blair Burwell
BY
ATTORNEYS United States Patent Office 3,256,057
Patented June 14, 1966

3,256,057
PROCESS OF RECOVERING HIGH PURITY TUNG-STEN COMPOSITIONS FROM TUNGSTEN-BEARING ORES
Blair Burwell, P.O. Box 1951, Grand Junction, Colo.
Filed Oct. 26, 1962, Ser. No. 233,266
8 Claims. (Cl. 23—15)

This invention relates to the recovery of tungsten from its ores and constitutes an improvement in the method of processing tungsten-bearing solutions to remove impurities. My process produces pure tungstic oxide or ammonium paratungstate containing less than .01 percent of combined impurities, expressed as nonvolatile residues, to meet new high purity markets for the metal.

In the treatment of tungsten ores or concentrates for the recovery of tungsten oxide, it is the custom of the industry to extract the tungsten from its ores in an alkaline aqueous solution by treating the ores with an excess of sodium carbonate under conditions of heat and pressure or by hot concentrated caustic soda. By this means, tungsten present in the ores as an insoluble compound with iron, manganese or calcium is converted to a water-soluble sodium tungstate. In this form it is separated from the insoluble minerals of the ore by filtration means and treated further to produce various tungsten compounds used in the industry.

A problem exists in this industry in that tungsten ores contain a number of other compounds as impurities which will also be converted to soluble sodium salts and which will contaminate the extract solution. When wolframite, hubnerite or ferberite ores are used, these contaminating elements are usually sodium salts of silica, alumina, arsenic and phosphorus. When scheelite ores are used, these contaminating elements also often include molybdenum. In addition to the metallic compounds, the solution usually contains a large excess of sodium carbonate or sodium hydroxide required to effect the decomposition of the tungsten minerals.

The solution is treated in a number of ways to recover the tungsten depending upon tungsten market requirements and the impurities in the solution. For example, one method consists of adding sufficient alkali sulfide, such as sodium sulfide, $Na_2S$, sodium bisulfide (NaHS) or ammonium sulfide $(NH_4)_2S$, to the alkaline solution to form $MoS_3$ of all the molybdenum present, and an excess varying from 50 to 100 percent, and sufficient mineral acid to give a pH of at least 3. The solution is then brought to a temperature of 80° C., or more, and the molybdenum sulfide precipitate separated from the solution by filtration. The tungsten content is separated from the solution by adjusting the pH to at least 7 and adding sufficient lime (CaO) or calcium chloride $(CaCl_2)$ to precipitate synthetic scheelite $(CaWO_4)$ and separating the purified calcium tungstate by filtration means.

Tungsten finds a market as a metal in a great number of products, each with different specifications and impurities. They are:

(1) In the steel industry in combination with molybdenum, vanadium and chromium as ferrotungsten or calcium tungstate.

These markets have varied from 35 to 65 percent of tungsten consumption. To supply them, it usually suffices to treat extract solutions with aluminum sulfate to precipitate phosphorus and subsequently treat the separated solution with sodium sulfide and sulfuric acid to precipitate molybdenum and arsenic as molybdenum and arsenic trisulfides. The partially purified solutions are then treated with calcium chloride to precipitate tungsten as calcium tungstate, which, when separated and dried, is then used to make ferrotungsten or added directly to the steel bath.

(2) In the rock-cutting and steel-cutting tools as cemented tungsten carbide, or in combination with cobalt, as a non-ferrous cutting material, such as stellite.

These markets have greatly increased in the past ten years and now consume more than 50 percent of present tungsten. A great variety of tungsten carbides are used with specifications varying from .05 to .20 percent in molybdenum and similar variations in silica, copper, etc.

To supply this market, calcium tungstate precipitate, removed from the extract solutions, or synthetic scheelite as it is called in the trade, is treated by a complicated process involving:

(a) Leaching with hot concentrated hydrochloric acid to form tungstic acid with the use of nitric acid to oxidize the precipitate and hydrofluoric acid to remove silica;

(b) Separation of precipitate by filtration from hot acid solutions;

(c) Treating of precipitate with aqua ammonia to form soluble ammonium tungstate and separating the extract ammonia solution from the ammonia insoluble residue by filtration means;

(d) Removing the excess ammonia in the ammonia solutions by evaporation or neutralization with hydrochloric acid and conversion of ammonium tungstate to the complex insoluble ammonium paratungstate salt;

(e) Separating the ammonium paratungsate salt from the extract solution by filtration, drying the salt and producing tungsten powder or tungsten carbide by the use of hydrogen or carbon. The large amount of tungsten contained in impure precipitates is returned for reprocessing or wasted.

(3) In the pure tungsten metal industry where highly purified ammonium paratungstate of an impurity limit, expressed as "non-volatile residue," of less than .01 percent, which includes the total silica, sodium, iron, aluminum, copper and other impurities in the ammonium paratungstate.

This market is supplied by refining and re-refining the ammonium paratungstate produced in the commercial ammonium paratungstate processing. This is done in a number of ways, such as redissolving the ammonium paratungstate in soda salts, reprecipitating it with pure calcium chloride and repeating the former steps.

Recently, new markets have developed for ultra-pure tungsten metals in forming missile components and other similar high temperature uses. As the conventional art in producing the ultra-pure metal is involved and expensive, and results in excessive loss of tungsten in the multiple processing steps employed, it is evident that an improvement in processing methods is needed to recover high purity tungsten directly from the ore extraction solutions, without the excessive loss of tungsten, and large amounts of costly chemicals introduced and labor costs involved in the batch operation of the present art.

It is an object of my invention to provide such an improved process which is free from the difficulties and costs encountered in previous, known processes, and which produces quite simply, directly and economically an essentially pure ammonium paratungstate salt from sodium tungstate plant solutions having a total impurity content, expressed as "non-volatile residue," of less than .01 percent which includes the total content of silica, sodium, iron, aluminum, copper and other impurities.

Another object of my invention is to provide a simple, economical and efficient procedure for separation and removal of soluble silica from an ore extract solution from which the pure ammonium paratungstate salt is subsequently extracted.

A further object of this invention is to provide novel recycling procedures by which compositions introduced at one stage of the treatment are supplied, at least in part, by material extracted at another stage of the treatment.

The practice of my invention will be described with reference to the accompanying flow sheet illustrating a typical circuit for the production of high purity ammonium paratungstate. The treatment as shown in the flow sheet has procedure for combining a series of chemical treatment and purification steps using both aqueous and organic extract solutions which leads to a high recovery of the valuable metal in a high purity form with low chemical and labor costs. The steps by which this result is obtained are as follows:

As shown in the flow sheet, tungsten ore or concentrate 2 is taken as the material for treatment and is first ground or otherwise reduced to a suitable degree of fineness in a grinding mill or the like 3 so as to pass a minus 100 mesh screen, for example, and is then mixed with an alkaline solution such as sodium carbonate or caustic soda as indicated at 4 to convert the tungsten compounds in the ore to soluble sodium tungstate as shown at 5 in conjunction with heat input as shown at 6 and water introduction as indicated at 7.

After so conditioning the aqueous solution, the sodium tungstate solution is separated from insolubles by filtration as shown at stage 8, and the insolubles are discharged to waste. An alkali sulfide, such as sodium sulfide, is introduced into the solution discharge from stage 8 and the pH is adjusted as by introduction of a mineral acid, such as sulfuric acid, to bring the pH in the range of at least 3. By so doing, the molybdenum content of the solution is converted to insoluble at stage 9 and is removed from the tungstate solution by filtering as shown at 10.

The solution discharge from filtration stage 10 is treated for separation of soluble silica as by introduction of a soluble fluorine salt or HF to form $SiF_6$ in stage 11. Following such conversion, an organic solution of aliphatic tertiary amine is fed to the aqueous solution at 12 and the aqueous phase of the resulting solution is separated at stage 13 and passed to waste. The organic phase so separated is washed with water at 14 forming a new aqueous phase which is separated from the organic phase at 15 and wasted. The organic phase so separated is next mixed with an ammonium hydroxide solution followed by another separation of aqueous phase from organic phase at 16.

The organic phase passing from the separation stage 16 is treated with a dilute $H_2SO_4$ solution which may comprise sulfuric acid and water fed in separate streams as shown in the feed to treatment stage 17. This produces another aqueous phase which is separated from the organic phase at 18 and preferably the separated acidic aqueous phase passing from stage 18 is recycled as the sulfuric acid input 19 to treatment stage 9. The separated organic phase passing from stage 18 also is recycled and mixed with the aliphatic tertiary amine comprising the organic solution introduced at 12 into the solution passing to treatment stage 13.

The aqueous phase passing from the separation at stage 16 has magnesium oxide introduced as shown at 20 and then is filtered at stage 21 for separation of tungsten solution from insolubles with the insolubles passing to waste. The separated aqueous phase containing tungsten in solution is mixed with recycled ammonium paratungstate mother liquor introduced at 22 and is then subjected to an evaporation treatment at stage 23 with heat introduced as indicated. The vapors from the evaporator are condensed at stage 24 and recycled as part of the ammonium hydroxide supply to separation stage 16. The solids of the evaporation treatment and some associated mother liquor pass to a filtration stage 25, the cake discharge of which, shown as insolubles, comprises high purity ammonium paratungstate which is dried and packed at stage 26 as a final product of the treatment. The separated mother liquor from filtration stage 25 is recycled to mixing stage 22 previously described.

In the flow sheet, the significant stages of the treatment have been given alphabetical designation in addition to the reference numerals previously referred to and will be summarized hereinafter with a detailed explanation of the practice at each such stage following this enumeration.

(A) (Flow sheet stage 5). Treat the tungsten bearing ore or concentrates with sodium carbonate or sodium hydroxide under heat or pressure to form water soluble alkali tungstate compounds.

(B) (Flow sheet stage 8). Separating the extract solution from the insoluble residue by filtering and washing means whereby a residue, substantially free of tungsten compounds, is discarded from a clarified alkaline extract solution containing the tungsten.

(C) (Flow sheet stage 9). A step of purification of the alkaline extract solution of molybdenum contamination which consists of the addition of a soluble alkaline sulfide salt, such as sodium sulfide and adjusting the pH to between two and three with mineral acid to form an insoluble molybdenum trisulfide which is separated from the extract solution of filter means.

(D) (Flow sheet stage 11). Treating the ore extract solution with a fluoride salt or hydrofluoric acid to complex the soluble silica in the solution as a $SiF_6$ anion.

(E) (Flow sheet stage 13). Extraction of the tungsten values from the aqueous purified acidic ore extract solution into a hydrophobic organic solvent solution consisting of tertiary amines in a kerosene fuel oil solvent solution byl mixing and settling means whereby the aqueous impurities in the ore extract solution containing soda salts sulfates, silica and alumina is discarded to waste, and the organic solution contains the tungsten values.

(F) (Flow sheet stage 14). Purification of the organic solvent solution of mechanically entrained aqueous solution by washing with water and separating and discarding the aqueous wash water.

(G) (Flow sheet stage 16). Extraction of the tungsten values contained in the organic by mixing and settling with a dilute ammonium hydroxide solution containing sufficient ammonia to form the soluble ammonium tungstate compound $(NH_4)_2WO_4$ and sufficient excess to give a pH between 7.5 and 9.5.

(H) (Flow sheet stage 21). Clarification and purification of the settled and separated tungsten-bearing extract solution by the addition of magnesium oxide and filter means if phosphorus is contained in the ammonium solution, or by sample clarification if not, and discarding the solids from the filtration steps leaving a pure solution containing the soluble ammonium tungstate.

(I) (Flow sheet stage 23). Extraction of the tungsten contained in the purified strip solution as the soluble ammonium tungstate $(NH_4)_2WO_4$ by converting it to the insoluble ammonium paratungstate of the approximate composition $5(NH_4)_2O \cdot 12WO_3 \cdot 5H_2O$ in an evaporated crystallizer, separating it from the mother liquor by filtration and washing means while recovering the aqueous ammonium hydroxide from the evaporator by condensation means.

(J) (Flow sheet stage 26). Drying the final ammonium paratungstate product at temperatures not greater than 220° C. to remove moisture.

(K) (Flow sheet stage 17). Treating the separated organic solvent from Step G to a regenerative and purification step with sulfuric acid to load a sulfate ion on the amine extracting molecule and remove any interfering ion and returning the treated organic back to Step C for cyclic use in the process.

(L) (Flow sheet stage 24). Collecting and returning the ammonium hydroxide recovered by condensation means to Step G for cyclic use in the process at the same time adding sufficient anhydrous ammonia to replace the $NH_3$ removed from the circuit in the ammonium paratungstate product discharged in Step J.

The requirements and procedures at each of said stages will now be detailed, reference being made to the alphabetical designation in each instance.

STEP A

In Step A of the process involving the dissolution of the ore and the extraction of tungsten as a water soluble akali tungstate, the preferred method of treating wolframite or hubnerite ores of tungsten in which the tungsten exists in combination with iron and maganese is by alkali fusion with sodium carbonate to which a small amount of sodium nitrate is added. The reaction is

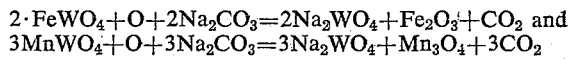

Usually equal parts of sodium carbonate to the ore is sufficient and the charge is heated to temperatures from 650° to 800° C. for 30 minutes, after which it is leached with hot water to extract the soluble sodium tungstate.

When the ore treated is scheelite, the preferred method is the use of sodium carbonate under pressures in excess of 165 pounds per square inch and temperatures corresponding to the steam pressures at that temperature. The reasons for this is that sodium carbonate, as a solvent, will extract substantially the major part of the tungsten if used in a quantity approximately in excess of five times the amount required to form $Na_2WO_4$ in the extract solution. Under these conditions, a minimum of silica and phosphorus is extracted. This is particularly advantageous in case the ore to be extracted contains tungsten as scheelite ($CaWO_4$), because in this reaction, a double decomposition is effected in the several states of the reaction as follows:

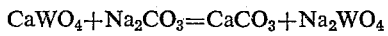

The method used to convert the tungsten compounds in the ore to a soluble sodium salt can be selected at the will of the operator depending on the type of ore to be treated, and it is not the intention of this invention to limit the process to any one method of carrying out this step.

STEPS B AND C

The slurry from the hot alkaline extract solution is separated from the residue by filter means. In case the solution is reasonably free of molybdenum and arsenic, it is treated with mineral acid, such as sulfuric acid, to a pH of at least 5. If it contains contaminating molybdenum, arsenic or antimony, it is purified by adding sufficient alkali sulfide to the alkaline solution to form molybdenum trisulfide, arsenic sulfide or antimony sulfide, when the solution is acidified. Usually 150 to 200 percent of the theoretical amount is sufficient. The solution is then heated to 80° C. approximately and acidified to a pH of 3, or less, whereupon the mloybdenum, arsenic and antimony form an insoluble compound and are separated from the tungsten-bearing solution by filter means.

STEP D

As a result of the purification treatment in Step C, the solution is acidic. I have found that the presence of a very small amount of silica will cause the formation of silico-tungstic acid. This is a heteropoly acid of the approximate formula $H_4SiW_{12}O_{40}.30H_2O$ and has an atomic weight of 3.419. In this compound, one gram of $SiO_2$ in the extract solution is combined with 46.4 grams of $WO_3$, and the result is a very heavy molecule, approximately 12 times as heavy as $WO_3$.

In a solution containing as low as .015 grams of $SiO_2$ per liter, the silico-tungstic acid is present in the quantity of .69 gram per liter. While methods of silica removal, such as treating extraction solutions with aluminum sulfate, cause a substantial reduction of silica content, and this method has been used in the art for a long time for partial purification of solutions of silica and phosphorus, it has not been effective in reducing the silica below .015 percent, under laboratory conditions, or below .020 percent, under less efficient plant conditions. The same condition exists with phosphorus, where the similar phospho-tungstic acid complex of the approximate formula $H_3PW_{12}O_{40}.12H_2O$ is formed.

It has been known for some time that acidic solutions containing $WO_3$ could be treated with various organic solvents, such as ketones, or with a wide range of amines to extract the tungsten from the aqueous phase into the organic phase. This has never been accomplished as an extractive process in plant solutions containing silica or phosphorus, or both, for the reason that the silico-tungstic acid and the phospho-tungstic complexes also load as a heavy anion in the organic. I have found that the amine organic element will load up to 350 grams per liter expressed as $WO_3$. As the liquid-to-liquid extraction of metal ions in an organic depend upon the mechanical separation of the tungsten loaded organic in the organic layer of gravity of approximately .75 from an aqueous layer which is usually 1.01, it has been found that the heteropoly complexes of silica and tungsten, or phosphorus and tungsten, cause the amine molecule to become so weighted that it exceeds the gravity of either the organic or aqueous component and separates out in the bottom of settlers, tanks and plant storage devices where it is either lost or involves trouble in providing means of recovery, and causing excessive losses in both tungsten and solvent organic.

I have found that the addition of a fluoride salt to the acid liquor converts the silica or phosphorus in the tungsten compound to a compound of the type $Na_2SiF_5$ or $NaPF_6$. In this form I have found that neither the silica nor phosphorus anion are extracted and separated into the organic solvent. While it is difficult to interpret the chemistry of these heteropoly complexes of tungsten, especially in terms of the variable ionic mechanisms of ion exchange, it is probable that the bulky double silico-fluoride anion or phospho-fluoride anion has an ionic structure which interferes or prevents it bonding into the amine.

It appears that this effect can be accomplished by adding any soluble salt of fluorine or hydrofluoric acid. It is necessary, however, to add the fluorine salt to the acid solution instead of the alkaline solution before acidification.

Example

As an example of the results obtained by this step of the invention, a quantity of acidified sodium tungstate acid liquor amounting to 34,000 pounds and containing 1100 pounds of tungsten expressed as $WO_3$ together with .0026 percent of $SiO_2$ and .001 percent $P_2O_5$ was treated at the rate of 10 gallons per minute in a single mixer-settler with an organic mixture introduced at the rate of 30 gallons per minute. The temperature of the aqueous phase was 130° F. and of the organic phase was 120° F. A total of 9,000 gallons of organic was circulated containing 580 pounds of tertiary amine (General Mills Alamine 336), 600 pounds of tributyl phosphate and 56,200 pounds of kerosene. The raffinate contained .002 percent $WO_3$ or 15.6 pounds of $WO_3$. The separated organic was washed in a 2-stage mixer-settler with water and the washed organic stripped with a solution of aqueous ammonia containing 1.8 percent $NH_3$ at a pH of 9 and temperature of 135° F. The tungsten contained in the ammonia strip solution was analyzed and found to contain 110 grams of $WO_3$ per liter and 993 pounds of $WO_3$.

A third phase heavy organo-silico-tungsten complex was separated in the bottom of the settler of the first mixer-settler unit. This gummy, water insoluble phase was heavier than the raffinate and analyzed 34 percent $WO_3$, 2.4 percent $SiO_2$ and contained approximately 88 pounds of tungsten expressed as $WO_3$. It also contained 121 pounds of tertiary amine and represented a loss of 8 percent of the tungsten and 36 percent of the organic amine. Although only a small amount of silica was present in the acid leach liquor, its effect was compounded to serious proportions by the formation of the heavy silico-tungstic acid complex.

In a succeeding processing run, the same quantity of acidified tungsten solution from molybdenum purification was used. It contained 1.150 pounds of $WO_3$, .003 percent $SiO_2$ and .001 percent $P_2O_5$. To the solution was added 25 pounds of ammonia acid fluoride ($NH_4HF_2$). The treated solution was processed at the same flow rate and temperature and with the same quantity of organic solution as was used in the first test. The organic solution had been restored to contain the same amount of tertiary amine (580 pounds) in kerosene.

The raffinate contained trace $WO_3$. No separation of a heavy third phase silico-organo tungsten complex occurred. After one stage of washing at the flow rate of 10 gallons per minute in the second mixer-settler, the washed organic was stripped in a third mixer-settler with a dilute ammonium hydroxide solution containing 1.75 percent $NH_3$ and a pH of 9.5 at a flow rate of 10 gallons per minute. This aqueous strip solution was returned condensate from the evaporator-crystallizer and was recycled until it contained 109 grames of tungsten per liter. Anhydrous ammonia was added while recycling to maintain a content of 1.75 percent free $NH_3$. The strip solution was measured, analyzed and found to contain 1.140 pounds of tungusten expressed as $WO_3$.

The raffinate contained trace $WO_3$. No separation of pounds of magnesium oxide and filtering in a pressure filter. The clarified solution was charged to a Struthers Wells evaporator-crystallizer and evaporated to .1 of the volume. The separated crystals analyzed:

|   | Percent |
|---|---|
| $SiO_2$ | .001. |
| Mo | .0015. |
| Na | .001. |
| Al | .0015. |
| Fe | .001. |
| Non-volatile residue | .004. |
| Loss on ignition | 10.7 |
| $WO_3$ | 89.2 to 89.3. |

STEP E

In this step the tungsten values in the purified aqueous extract solution are extracted into an organic phase while the remaining impurities are left in the aqueous phase.

The organic phase employed is made up of an amine dissolved in a suitable organic solvent, both of which are insoluble or sparingly soluble in water. The amine must be capable of forming organo-tungsten amine complexes which are insoluble in water and soluble in the organic phase.

I have found that tertiary amines, represented by the formula

where R represents a $C_8$–$C_{10}$ mixture, are suitable for this purpose, although the invention is not limited to this particular carbon chain length.

Tris(tridecyl)amine, tris amyl amine or tris isooctyl amine, and tri lauryl amine, among other variations, can be used.

Organic extraction is best accomplished by contact of the two phases in one or more mixer-settler combinations. Tributyl phosphorus in kerosene, or di isobutyl ketone in kerosene, is satisfactory as an organic diluent, although other extractant diluents are satisfactory and a number of other solvents are usable in the invention.

The extraction is preferably carried out at temperatures at or about 100° F. for both phases in order to assist settling and assist dispersion of the amine extractant in the organic diluent. The extraction can be carried out at lower temperatures as desired. I have found that under proper conditions, the organic extractant can carry up to 25 grams of $WO_3$ per liter. However, the best results are obtained between 10 and 15 grams per liter.

STEP F

After extracting the tungsten from the aqueous phase and separating the organic by settling means, the organic phase will contain approximately 99 percent of the tungsten present in the aqueous phase. It also contains some mechanically entrained drops of aqueous solution. In order to remove all contamination, the organic phase may be washed with water in a mixer-settler such as used in the original extraction. While the method of washing may be selected from a number of devices, a mixer-settler of the type used in the original extraction has been found to be preferable because the flow rates and separating rates are the same. One or more mixer-settlers can be used as required. The water used in this step should preferably be silica free or deionized.

STEP G

After washing the organic in water, the tungsten is stripped from the organic phase by mixing in a mixer-settler unit with a dilute solution of ammonium hydroxide. This solution should preferably be substantially free of silica and soda and other dissolved salts and contain sufficient ammonia ($NH_3$) to form $(NH_4)_2WO_3$ with all the tungsten contained in the organic and, in addition, have sufficient excess ammonia to establish a pH in excess of 7.5.

The preferred method of preparing this extract solution is to use the dilute ammonia-bearing condensate from the later evaporation step. However, if the operator does not have a substantially silica-free solution to affect this stripping, I have found that the addition of a small amount of an ammonium fluoride salt, or HF, will prevent the contamination of silica in the ammonium paratungstate extracted from the strip solution.

It is desirable, but not necessary, to extract the tungsten from the organic phase in an aqueous phase containing at least 9 percent or 100 grams of $WO_3$ per liter. This is principally for the economy of conducting the succeeding steps of the process. It also is desirable to avoid the extraction in a solution containing in excess of 15 percent $WO_3$ for the reason that solid ammonium paratungstate, and possibly metatungstate, separates out in the aqueous extract solution which mechanically interferes with the liquid-to-liquid separation. To effect this condition, the stripping is preferably done in one or two mixer-settler combinations wherein a portion of the strip solution is recirculated in contact with the organic to establish a tungsten concentration between 9 and 15 percent expressed as $WO_3$.

STEP H

In this step the tungsten-bearing strip liquor is clarified of any accidental solids inclusions by filtration means. If the solution contains a trace of phosphorous from accidental contamination or otherwise, I have found that a small amount of solid magnesium oxide added to the strip solution will remove the phosphorus substantially completely as ammonium magnesium phosphate.

STEP I

The clarified liquor from Step H is preferably treated to recover its tungsten values by evaporation means whereby the excess ammonia is removed with the water vapor and condensed for cyclic reuse in Step G. By this means, the soluble $(NH_4)WO_3$ compound is decomposed to form insoluble ammonia paratungstate,

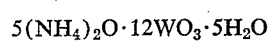

The ammonium paratungstate is separated from the mother liquor by filtration means and washed with distilled water. A small amount of the mother liquor is preferably recycled to the process to avoid a build up of organic impurities. I have found that a recycle of from 5 to 10 percent of the solution will maintain a high purity product.

STEP J

The ammonium paratungstate product is dried in a suitable drier at temperatures from 200° to 220° F. for a sufficient time to expel the moisture.

STEP K

After stripping the tungsten from the organic phase by ammonia as described in Step G, it will be found that the amine organic must be treated by an acid solution to restore a sulfate or nitrate ion before its reuse in extracting tungsten from aqueous solution. This can be effected by supplying $SO_4$ ions in the tungsten solution, or by treating the stripped organic phase in a mixer-settler with an aqueous solution of sulfuric acid, at the will of the operator.

The preferred way is to treat the organic phase in a mixer-settler with approximately .1 N sulfuric acid solution, separate the aqueous sulfuric acid and reuse it in a cyclic manner while maintaining the acid concentration at a desired level. It is sometimes desirable to include a small amount of nitric acid in this acid solution.

STEP L

This step involves the recovery and cyclic reuse of pure dilute ammonium hydroxide solution from the evaporation step of Step I.

The recovery and reuse of ammonia in this cyclic manner is of substantial benefit in reducing the costs of the process as well as in providing a source of pure and silica-free ammonia stripping solution.

Example

As an example of a process embodying the steps of this invention, ammonium paratungstate was prepared from a tungsten-bearing ore containing 23 percent $WO_3$. Five tons of this ore was mixed with 23,000 pounds of water and 5,175 pounds of soda ash and subjected to 200 pounds of pressure and 385° F. temperature for two hours in a closed digestion vessel.

The slurry was cooled and subjected to filtration and washing producing a tungsten-bearing alkaline solution containing 3.5 percent $WO_3$ and .05 percent Mo and a residue containing .55 percent $WO_3$. To the solution was added 150 percent of the amount of NaHS, in liquid form, to form the compound $MoS_3$ with all the molybdenum present and the solution was heated to 80° C. The pH was then adjusted to 2.5 with sulfuric acid. The hot slurry was filtered and the precipitated $MoS_3$ separated. The filtrate was then transferred to a storage tank for further purification.

Thirty-four thousand pounds of this acidified solution, containing 1,150 pounds of $WO_3$, .003 percent $SiO_2$ and .001 percent $P_2O_5$ was treated as noted in Step C with an organic solvent in a one stage mixer-settler.

The raffinate contained trace $WO_3$. No separation of a heavy third phase silico-organo tungsten complex occurred. After one stage of washing at the flow rate of 10 gallons per minute in the second mixer-settler, the washed organic was stripped in a third mixer-settler with a dilute ammonium hydroxide solution containing 1.75 percent $NH_3$ and a pH of 9.5 at a flow rate of 10 gallons per minute. This aqueous strip solution was returned condensate from the evaporator-crystallizer and was recycled until it contained 109 grams of tungsten per liter. Anhydrous ammonia was added while recycling to maintain a content of 1.75 percent free $NH_3$. The strip solution was measured, analyzed and found to contain 1,140 pounds of tungsten expressed as $WO_3$.

This strip solution was further clarified by adding 25 pounds of magnesium oxide and filtering in a pressure filter. The clarified solution was charged to a Struthers Wells evaporator-crystallizer and evaporated to .1 of the volume. The separated crystals analyzed:

| | Percent |
|---|---|
| $SiO_2$ | .001. |
| Mo | .0015. |
| Na | .001. |
| Al | .0015. |
| Fe | .001. |
| Non-volatile residue | .004. |
| Loss on ignition | 10.7. |
| $WO_3$ | 89.2 to 89.3. |

I claim:

1. A process of recovering tungsten values from a tungsten-bearing ore, which comprises treating the ore with sodium carbonate and heat for converting tungsten compounds in the ore to sodium tungstate, leaching the ore with water to dissolve the sodium tungstate, removing the insoluble residue from the aqueous leach liquor by filtration, adding a soluble alkali sulfide salt to the leach liquor, acidifying said leach liquor with sulfuric acid to a pH of at least 3, heating the acidified liquor to 80° C., separating insoluble molybdenum sulfide from the solution by filtration, adding fluorine in the form of a soluble fluorine salt or hydrofluoric acid to the acidified liquor in a quantity to give at least 6 moles of fluorine for every molecule of silica and phosphorus contained in the solution, contacting the acidified and fluorine treated acidic solution with a kerosene solution containing a hydrophobic organic amine composition capable of forming a water insoluble organic amine tungsten complex and extracting the tungsten content of the aqueous phase into the organic phase, washing the organic phase with water to separate mechanically entrained aqueous impurities, contacting the separated and washed organic phase with a pure aqueous ammonia solution containing sufficient ammonia to form ammonium tungstate with the tungsten contained in the organic and, in addition, to give a pH of at least 7.5 whereby the tungsten content of the organic is extracted into the aqueous ammonium hydroxide solution, adding solid magnesium oxide to the ammonia extract solution to precipitate contained phosphorus as ammonium magnesium phosphate, separating the phosphorus composition so precipitated from the solution, clarifying the ammonium hydroxide solution containing the extracted tungsten by filtration, subjecting the clarified solution to evaporation to expel most of the water and contained ammonia whereby insoluble ammonium paratungstate is formed, and discharging dried insoluble ammonium paratungstate crystals as a final product of the treatment.

2. A process of recovering tungsten values from a tungsten-bearing ore having some calcium, silica, phosphorous and molybdenum components as impurities, which comprises fusing the ore with sodium carbonate at a temperature of at least 650° C. for at least 30 minutes thereby converting tungsten compounds in the ore to soluble sodium tungstate and leaving some impurities present in the ore as insoluble material, leaching the fused material in water to dissolve the sodium tungstate, removing the insoluble residue from the aqueous leach liquor by filtration, acidifying the leached liquor with sulfuric acid after insoluble removal to establish a pH of at least 3, heating the acidified liquor to about 80° C., separating insoluble molybdenum sulfide from the solution by filtration, adding fluorine in the form of a soluble fluorine salt or hydrofluoric acid to the acidified liquor in a quantity to give at least 6 moles of fluorine for every molecule of silica and phosphorous contained in the solution, contacting the acidified and fluorine treated acidic solution with a kerosene solution containing a hydrophobic organic amine composition capable of forming a water insoluble organic amine tungsten complex and extracting the tungstate anion component of the sodium tungstate in said complex while the cationic sodium ion remains in the separated aqueous phase, washing the organic phase with water to separate mechanically entrained aqueous impurities, contacting the separated and washed organic phase with a pure aqueous ammonia solution containing sufficient ammonia to form ammonium tungstate with the tungsten contained in the organic and, in addition, to give a pH of at least 7.5 whereby the tungsten content of the organic is extracted into the aqueous ammonium hydroxide solution, clarifying the ammonium hydroxide solution containing the extracted tungsten by filtration, subjecting the clarified solution to evaporation to expel most of the water and contained ammonia whereby insoluble ammonium paratungstate is formed, and discharging dried insoluble ammonium paratungstate crystals as a final product of the treatment.

3. A process of recovering tungsten values from a tungsten-bearing ore having some calcium, silica and phosphorous components and substantially no molybdenum as impurities, which comprises fusing the ore with sodium carbonate at a temperature of at least 650° C. for at least 30 minutes thereby converting tungsten compounds in the ore to soluble sodium tungstate and leaving some impurities present in the ore as insoluble material, leaching the fused material in water to dissolve the sodium tungstate, removing the insoluble residue from the aqueous leach liquor by filtration, acidifying the leached liquor with sulfuric acid after insoluble removal to establish a pH of at least 5, adding fluorine in the form of a soluble fluorine salt or hydrofluoric acid to the acidified liquor in a quantity to give at least 6 moles of fluorine for every molecule of silica and phosphorous contained in the solution, contacting the acidified and fluorine treated acidic solution with a kerosene solution containing a hydrophobic organic amine composition capable of forming a water insoluble organic amine tungsten complex and extracting the tungstate anion component of the sodium tungstate in said complex while the cationic sodium ion remains in the separated aqueous phase, washing the organic phase with water to separate mechanically entrained aqueous impurities, contacting the separated and washed organic phase with a pure aqueous ammonia solution containing sufficient ammonia to form ammonium tungstate with the tungsten contained in the organic and, in addition, to give a pH of at least 7.5 whereby the tungsten content of the organic is extracted into the aqueous ammonium hydroxide solution, clarifying the ammonium hydroxide solution containing the extracted tungsten by filtration, subjecting the clarified solution to evaporation to expel most of the water and contained ammonia whereby insoluble ammonium paratungstate is formed, and discharging dried insoluble ammonium paratungstate crystals as a final product of the treatment.

4. A process as defined in claim 3 in which the mother liquor containing ammonium paratungstate crystals after the evaporation treatment is filtered for separation of said crystals, and some of the mother liquor is recycled into the material subjected to the evaporation treatment.

5. A process as defined in claim 3, in which the amine organic material after the tungsten is stripped from the organic phase is recycled to the organic solution introduction stage, and some sulfuric acid solution is added during recycling to replace $SO_4$ ions removed in a preceding cycle.

6. A process as defined in claim 3, in which a mixture of sodium carbonate and sodium hydroxide is introduced into the ore fusing stage.

7. A process as defined in claim 3, in which magnesium oxide is added to the ammonium hydroxide solution passing to evaporation to precipitate contained phosphorus in the solution, and removing the precipitate from the solution before it is subjected to evaporation.

8. A process of recovering tungsten values from a tungsten-bearing ore having some calcium, silica and phosphorous components and substantially no molybdenum as impurities, which comprises treating the ore with sodium carbonate and heat for converting tungsten compounds in the ore to soluble sodium tungstate and leaving some impurities present in the ore as insoluble material, leaching the ore so treated with an excess of sodium carbonate solution under gauge pressures exceeding 155 pounds per square inch and temperatures in excess of 368° F. for not less than one hour to dissolve the sodium tungstate, removing the insoluble residue from the aqueous leach liquor by filtration, acidifying the leached liquor with sulfuric acid after insoluble removal to establish a pH of at least 5, adding fluorine in the form of a soluble fluorine salt or hydrofluoric acid to the acidified liquor in a quantity to give at least 6 moles of fluorine for every molecule of silica and phosphorous contained in the solution, contacting the acidified and fluorine treated acidic solution with a kerosene solution containing a hydrophobic organic amine composition capable of forming a water insoluble organic amine tungsten complex and extracting the tungstate anion component of the sodium tungstate in said complex while the cationic sodium ion remains in the separated aqueous phase, washing the organic phase with water to separate mechanically entrained aqueous impurities, contacting the separated and washed organic phase with a pure aqueous ammonia solution containing sufficient ammonia to form ammonium tungstate with the tungsten contained in the organic and, in addition, to give a pH of at least 7.5 whereby the tungsten content of the organic is extracted into the aqueous ammonium hydroxide solution, clarifying the ammonium hydroxide solution containing the extracted tungsten by filtration, subjecting the clarified solution to evaporation to expel most of the water and contained ammonia whereby insoluble ammonium paratungstate is formed, and discharging dried insoluble ammonium paratungstate crystals as a final product of the treatment.

References Cited by the Examiner

UNITED STATES PATENTS

| | | | |
|---|---|---|---|
| 1,388,857 | 8/1921 | Giles et al. | 23—18 |
| 2,339,888 | 1/1944 | Smith | 23—18 |
| 2,963,342 | 12/1960 | Pilloton et al. | 23—18 |
| 3,052,516 | 9/1962 | Drobnick et al. | 23—51 |
| 3,158,438 | 11/1964 | Kurtak | 23—51 X |

FOREIGN PATENTS

| | | |
|---|---|---|
| 122,051 | 1/1919 | Great Britain. |

OSCAR R. VERTIZ, *Primary Examiner.*

BENJAMIN HENKIN, *Examiner.*

H. T. CARTER, *Assistant Examiner.*